June 2, 1925.
S. B. SCHENCK
MOTOR CONTROL SYSTEM
Filed June 3, 1921
1,539,872
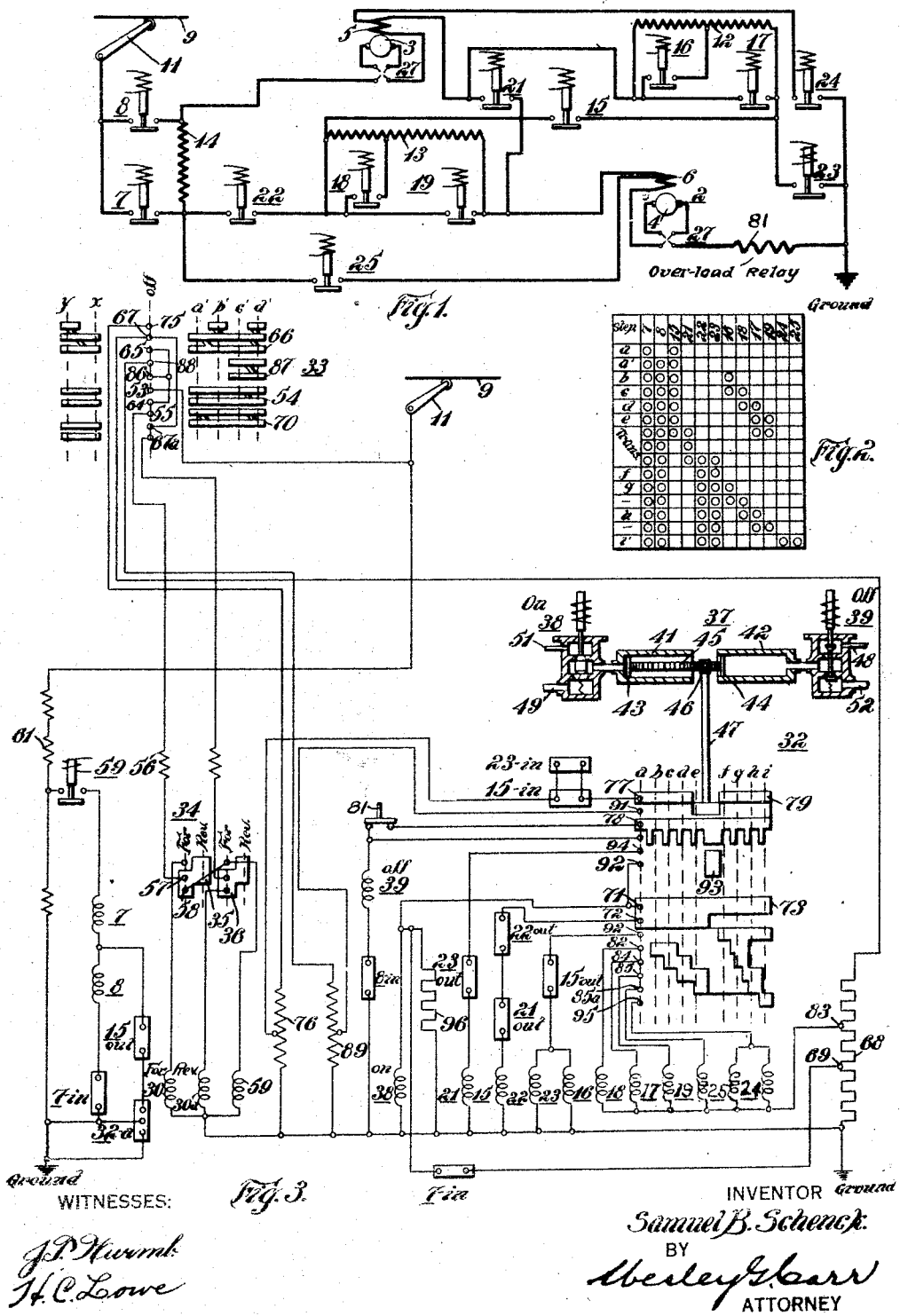

Patented June 2, 1925.

1,539,872

UNITED STATES PATENT OFFICE.

SAMUEL B. SCHENCK, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed June 3, 1921. Serial No. 474,721.

*To all whom it may concern:*

Be it known that I, SAMUEL B. SCHENCK, a citizen of the United States, and a resident of Edgewood Park, in the county of Allegheny and State of Pennsylvania, have invented a new and useful Improvement in Motor-Control Systems, of which the following is a specification.

My invention relates to motor-control systems and its has particular relation to control systems that are employed to govern the operation of a plurality of motors that drive a railway vehicle.

One object of my invention is to provide a control system that shall be relatively simple and economical in construction and positive and effective in operation.

Another object of my invention is to energize the actuating coils of a plurality of contactors or switches that govern the operation of a main controller or sequence switch, from the same source of energy that furnishes power to a plurality of motors.

Still another object of my invention is to provide a control system in which the progressive and the multiple relays, formerly employed for governing a plurality of contactors to change the connections of the motors from series relation to parallel relation, are omitted although the same operating characteristics are secured.

Still another object of my invention is to provide a special interlocking arrangement for a plurality of line switches that have their actuating coils energized by a single wire.

Heretofore, in some cases, the main controller of a control system has been actuated by a motor which was so designed as to be energized directly from the same source of energy as the main motors; or the main controller has been omitted and the sequence of operation of the contactors has been secured by mutual electrical interlocking and by a plurality of relays, the actuating coils of the contactors and relays being energized from the same source of energy that energizes the main motors.

Briefly speaking, my invention consists, in one aspect, in governing the operation of a main controller by electrical energy that is supplied from a trolley through a plurality of resistors and a master controller and omitting the customary progressive and multiple relays.

My invention also consists in securing the operation of a plurality of line switches or circuit-breakers that have their actuating coils energized by a single circuit and in having the circuit-breakers close sequentially pior to the time that the main controller leaves a predetermined position.

For a better understanding of my invention, reference may be made to the accompanying drawing, Figure 1 of which is a schematic view of the main control circuits for governing the operation of a plurality of motors in accordance with my invention;

Fig. 2 is a sequence chart showing the order of closure of a plurality of contactors employed to govern the control system shown in Fig. 1; and Fig. 3 is a diagrammatic view of the secondary or auxiliary circuits that govern the operation of the contactors that are illustrated in Fig. 1.

Referring particularly to Fig. 1 of the drawing, a plurality of motors 1 and 2, respectively having armatures 3 and 4 and series field-magnet windings 5 and 6, may be energized upon the closure of one or both of a plurality of line switches or circuit-breakers 7 and 8 by a circuit that is established from a suitable source of energy, such as a trolley wire 9, through the trolley-pole 11 and the contact members of the circuit-breakers 7 and 8.

A plurality of starting resistors 12, 13 and 14 are employed to govern the current traversing the motors 1 and 2. A series contactor 15 is employed for connecting the motors 1 and 2 in series relation. A plurality of accelerating contactors 16 and 17 are employed for shunting portions of the starting resistor 12, and corresponding contactors 18 and 19 are employed for shunting portions of the second starting resistor 13.

A second series or transition contactor 21 is employed for maintaining a series connection of the motors 1 and 2 while the transition from series to parallel relation is being effected. Parallel contactor 22 and ground contactor 23 are employed for connecting the motors 1 and 2 in parallel relation.

Field contactors 24 and 25 are employed for shunting portions of the field-magnet windings 5 and 6, respectively, of the motors 1 and 2. A plurality of reversing switches 27 are employed for changing the relation of the armatures 3 and 4, respectively, to their corresponding field-magnet windinngs 5 and 6.

Referring particularly to Fig. 3, a main controller 32 is employed for governing the energization of the actuating coils of the contactors 15 to 19, inclusive, and 21 to 25, inclusive, that are illustrated in Fig. 1. The controller has a plurality of operating positions $a$ to $i$, inclusive.

The operation of the main controller 32 is governed by a master controller 33 having a central "off" position, a plurality of forward operation positions $a'$, $b'$, $c'$ and $d'$ and a plurality of reverse operating positions $x$ and $y$.

The reversing switches 27 form a part of a main reverser 34. The main reverser 34 is provided with a plurality of contact segments 35 and 36 and a plurality of contact fingers and is actuated in a forward and in a reverse direction by a plurality of coils 30 and 30a, respectively.

The main controller 32 is actuated by an electro-pneumatic engine 37, which is provided with an "on" valve 38 and an "off" valve 39. The engine 37 comprises a plurality of cylinders 41 and 42 in which are movably mounted pistons 43 and 44, respectively, which are mechanically connected together by means of a rack member 45.

The rack member 45 actuates a pinion 46 that is mounted upon a shaft 47, upon which the main controller 32 is also mounted. Under normal conditions, when both actuating coils of the valve mechanism 38 and 39 are de-energized, the rack member 45, by reason of the presence of fluid pressure in cylinder 42 only, is biased to the "off" position, which is the position illustrated in Fig. 3 of the drawing.

When both the actuating coils of the valve mechanism 38 and 39 are energized, fluid is supplied from the inlet port 51 of the valve mechanism 48 to the cylinder 41, thereby applying pressure to the piston 43, while the fluid within the other cylinder 42 is emitted through the exhaust port 52 of the valve mechanism 39. In this way, the pressure upon the piston 44, is reduced to permit the rack member 45 to actuate the pinion 46 and shaft 47, thereby causing the main controller 32 to rotate in a forward direction.

When the actuating coil of the valve mechanism 38 is energized and the actuating coil of the valve mechanism 39 is de-energized, fluid pressure is applied equally to the pistons 43 and 44, causing the rack member 45 to stop at whatever position it may at the time occupy.

Upon the de-energization of both the actuating coils of the valve mechanism 38 and 39, fluid pressure is supplied through the inlet port 48 of the valve mechanism 39 to the cylinder 42, thereby actuating the piston 44 to the "off" position, as the inlet port 51 of the valve mechanism 38 is closed and the exhaust port 39 is opened, thereby permitting fluid from the cylinder 41 to be exhausted.

The operation of my control system is begun by actuating the master controller 33 from the "off" position to position $a'$, thereby establishing a circuit from the trolley wire 9 through control finger 53, contact segment 54, control fingers 64 and 65, contact segment 66, control fingers 67 and 67a, contact segment 70 and control finger 55 of the master controller 33, control resistor 56, contact terminal 57 of the main reverser 34, contact segment 35, contact finger 58, and the actuating coil of the line relay 59 to Ground. However, as the master reverser 34 already occupies its forward position, the forward actuating coil 30 will not be energized.

Upon the closure of the line relay 59, a circuit is established from the trolley 9 through control resistor 61, contact members of line relay 59, actuating coil of line switch or circuit-breaker 7, interlock 15-out and drum interlock 32–$a$ to Ground.

Upon the closure of the line switch or circuit-breaker 7, a circuit is established from the trolley 9 through control finger 53, contact segment 54, control fingers 64 and 65, contact segment 66 and control finger 67 of the master controller 33, a portion of the control resistor 68, tap 69 of the control resistor, interlock 7–in, contact terminals 71 and 72 of the main controller 32, which are bridged by contact segment 73, interlocks 22–out and 21–out and the actuating coil of the contactor 15 to Ground.

When the line switch 7 and the contactor 15 are closed, a main circuit is established from the trolley 9 through the contact members of circuit-breaker 7, starting resistor 14, reversing switch 27, armature 3 and series field-magnet winding 5 of the motor 1, starting resistor 12, series contactor 15, starting resistor 13, series field-magnet winding 6, armature 4 of the motor 2, reversing switch 27 and the actuating coil of the overload relay 81 to Ground.

The motors 1 and 2 operate at their lowest speed, as they are connected in series relation and the starting resistors 12, 13 and 14 are in circuit therewith.

As soon as the line switch 7 has closed, a circuit is established from the actuating coil of the line switch 7 through the actuating coil of the line switch 8 and interlocks 7–in and 32–a to Ground. The line switch 8 will assume its closed position as soon as the circuit that shunts its actuating coil is broken by the interlock 15–out opening when the contactor 15 assumes its closed position, To further accelerate the motors 1 and 2, it is necessary that the master controller 33 be actuated to its second position $b'$, thereby establishing a circuit from trolley 9 through control finger 53 of the master controller 33, contact segment 54, control fingers 64 and 65, contact segment 66, control finger 75, a portion of control resistor 76, interlock 15–in, control fingers 77 and 78, which are bridged by the contact segment 79 of the main controller 32, overload relay 81, the actuating coil of the "off" valve mechanism 39 and interlock 8–in to Ground.

The actuating valve of the "on" valve mechanism 38 is energized after the closure of the line switch 7 by a circuit from the tap-point 69 of the control resistor 68 through interlock 7–in and actuating coil of the "on" valve 38 to Ground. Upon the concurrent energization of the actuating coils of the valve mechanism 38 and 39, air pressure is applied to the piston 43 and is released from the piston 44, thereby actuating the rack member 45 of the "off" valve mechanism, to cause the main controller 32 to be actuated to position $b$.

When the main controller 32 is moved from position $a$, the interlock 32–a, which governs the energization of the line switch 8, is opened, thereby preventing the shunt circuit comprising the actuating coil of the line switch 7 and interlock 15–out from being reestablished, if the circuit-breakers 7 and 8 are opened, until the main controller 32 has been returned to position $a$.

When the main controller 32 occupies position $b$, a circuit is established from the tap-point 69 of the control resistor 68, through interlock 7–in, control finger 71 of the main controller 32, contact segment 73, control finger 82, and actuating coil of the contactor 16, to tap-point 83 of control resistor 68.

Upon the closure of the line switch 8 and the accelerating contactor 16, the starting resistor 14 and a portion of the accelerating resistor 12 are shunted, thereby increasing the voltage applied to the motors 1 and 2 to thus increase the speed of the vehicle. The accelerating contactors 18, 17 and 19 are closed, in accordance with the sequence chart shown in Fig. 2, upon the main controller 32 being actuated to position $c$, $d$ and $e$, respectively.

When the controller 32 is actuated to position $e$, control finger 77 of the main controller 32 no longer engages contact segment 79, whereby the circuit comprising the actuating coil of the "off" valve mechanism 39 is broken.

When the actuating coil of the "off" valve mechanism is de-energized, fluid pressure is applied to the piston 44 to a sufficient degree to balance the pressure upon the piston 43, thereby preventing further movement of the rack member 45 to cause the main controller 32 to remain in position $e$.

In position $e$, line switches 7 and 8 contactors 15, 17 and 19 are closed, thereby establishing a circuit from the trolley 9 through line switch or circuit-breaker 8, reversing switch 27, armature 3, series field-magnet winding 5 of the motor 1, contactors 17, 15 and 19, series field-magnet winding 6, armature 4 of the motor 2, reversing switch 27 and actuating coil of the overload relay 81 to Ground.

The motors 1 and 2 are now operating in series relation with the accelerating resistors 12, 13 and 14 shunted.

Before the main controller 32 will continue its forward movement, it is necessary to actuate the master controller 33 to position $c'$. In position $c'$, a circuit is established from the trolley 9 through control finger 53 of the master controller 33, contact segment 54, control fingers 64 and 86, contact segment 87, control finger 88, auxiliary control resistor 89, control finger 91 of the main controller 32, contact segment 79, control finger 78, contact members of the overload relay 81, actuating coil of the "off" valve mechanism 39 and interlock 8–in to Ground. The main controller 32 will be actuated by the electro-pneumatic engine 37 to position $f$, in which position contact terminal 91 no longer engages contact segment 79, thus de-energizing the actuating coil of the "off" valve 39.

During the passage of the main controller 32 through the transition position between positions $e$ and $f$, a circuit is established from the tap-point 69 of the auxiliary control resistor 68, through interlock 7–in, control finger 92 of the main controller 32, contact segment 93, control finger 94, interlock 23–out and the actuating coil of the transition contactor 21 to Ground.

When the main controller 32 is actuated to position $f$, contact segment 93 no longer engages control fingers 92 and 84, thus breaking the circuit comprising the actuating coil of the contactor 21. After the closure of the transition contactor 21, further movement of the main controller 32 disengages control fingers 85 and 85a, of the main controller 32 from the contact segment 73 and the actuating coils of the contactors 17 and 19 are de-energized, thus permitting these contactors to assume their open positions.

After the series contactor 15 assumes its open position, the Ground contactor 23 and the parallel contactor 22 are closed by a circuit that is established from the tap-point 69 of the control resistor 68 through interlock 7–in, contact terminal 71 of the main controller 32, contact segment 73, contact terminal 92', interlock 15–out, and the parallel-connected actuating coils of parallel contactor 22 and Ground contactor 23 to Ground.

In position $f$, line switches 7 and 8 and the parallel-connecting contactors 22 and 23 are closed, thereby connecting the motors 1 and 2 in parallel relation; the starting resistors 12 and 13 being in series relation, respectively, with the motors 1 and 2.

To further increase the speed of the motors, it is necessary that the master controller 33 be actuated to position $d'$, thereby establishing a circuit from the trolley 9 through control finger 53, contact segment 54, control fingers 64 and 65, contact segment 66, control fingers 75, auxiliary control resistor 76, interlock 23–in, control finger 77 of the main controller 32, contact segment 79, control finger 78, actuating coil of the "off" valve mechanism 39 and interlock 8–in to Ground.

The main controller 32 will thereupon be actuated through positions $g$ and $h$ to position $i$. At position $g$, contact segment 73 engages contact terminals 82 and 84, thereby energizing the actuating coils of the accelerating contactors 16 and 18 and thus shunting portions of the starting resistors 12 and 13, respectively.

In position $h$, contact segment 73 engages contact terminals 85 and 85$a$, thereby energizing the actuating coils of accelerating contactors 17 and 19, thus completely shunting the starting resistors 12 and 13.

The motors 1 and 2 further accelerated upon the main controller 32 being actuated to position $i$, as the contact segment 73 of main controller 32 engages contact terminal 95, thereby establishing a circuit from tap-point 83 of control resistor 68 through the parallel-connected actuating coils of the field contactors 24 and 25, control finger 95, contact segment 73, control finger 71 and interlock 7–in to tap-point 69 of the control resistor 68.

Upon the closure of the field contactors 24 and 25, portions of the series field-magnet windings 5 and 6, respectively, are shunted, thereby increasing the speed of the corresponding motors 1 and 2. An auxiliary resistor 96 is connected in shunt relation to the actuating coils of the contactors 15–19, inclusive, and 21 to 25, inclusive, to provide discharge circuits for actuating coils and to ensure the opening of the contactors after the line switches 7 and 8, thereby preventing the impairment of the contactors because of arcing.

It will be noted that during the acceleration of the motors 1 and 2 by means of the master controller 33 and the main controller 32, no progressive or multiple relays are employed and that the energization of the actuating coils of the contactors that govern the control system and the actuating coils of the electro-pneumatic engine 27 is effected by connecting the actuating coils in circuit with a plurality of auxiliary resistors and the master controller to the source of electrical energy 9.

It will also be noted that closure of the line switches or circuit-breakers 7 and 8 is effected in sequence from a single wire and prior to the master controller 32 being actuated from its first position.

While I have shown my invention in a preferred form, it is apparent that minor modifications may be made in the arrangement of circuits and the apparatus employed without departing from the spirit of my invention. I desire, therefore, to be limited only by the scope of the appended claims.

I claim as my invention:

1. In a control system, the combination with a plurality of switches having actuating coils, said coils being connected in series relation one with another, of a resistor adapted to be shunted by the concurrent closure of said switches and means comprising a controller for providing a shunt circuit for one of said coils for maintaining one of said switches in its open position to temporarily prevent the shunting of said resistor.

2. In a control system, the combination with a plurality of switches having actuating coils, said coils being connected in series relation one with another, of means comprising a controller for providing a shunt circuit for one of said coils for maintaining one of said switches in its open position until after the closure of another of said switches and interlocking means governed by one switch for closing a circuit comprising the actuating coils of each of said switches.

3. In a control system, the combination with a plurality of switches having actuating coils, said coils being connected in series relation one with another, of means comprising a controller having a plurality of positions for shunting one of said coils, said shunting means being operative only upon said controller occupying a predetermined position.

4. In a control system, the combination with a plurality of switches having actuating coils, the coils of two of said switches being connected in series relation one with another, of means comprising a controller having a plurality of positions for shunting one of said coils, said shunting means being inoperative upon said controller occupying a predetermined position, and interlocking means governed by a third switch for partly closing the shunt circuit around said one coil.

5. In a control system, the combination with a plurality of switches having actuating coils, said coils being connected in series relation one with another, of means comprising an interlocking device governed by one of said switches and a controller having a plurality of positions for shunting one of said coils during a portion of the time that said controller occupies a predetermined position.

6. In a control system, the combination with a plurality of switches having actuating coils, said coils being connected in series relation one with another, of means comprising an interlocking device governed by one of said switches for preventing the simultaneous closure of said switches, means comprising a controller having a plurality of positions for shunting one of said coils to maintain one of said switches in its open position and means comprising a contactor having an interlock for rendering said shunting means inoperative upon said contactor assuming a predetermined position.

7. In a control system, the combination with a plurality of switches having actuating coils, said coils being connected in series relation one with another, of means comprising an interlocking device governed by one of said switches for preventing the simultaneous closure of said switches, means comprising a controller having a plurality of positions for shunting one of said coils to maintain one of said switches in its open position and means comprising a contactor having an interlock for rendering said shunting means inoperative prior to said controller being actuated from its "off" position.

8. In a control system, the combination with a plurality of line switches having actuating coils, said coils being connected in series relation one with another, of a master controller, means comprising a relay governed by said controller for energizing one of said actuating coils, means for shunting the actuating coils of one of said switches comprising a main controller governed by said master controller for preventing said line switches from closing simultaneously, and means comprising a contactor having an interlock for rendering said shunting means inoperative upon said contactor assuming a predetermined position.

9. In a control system, the combination with a plurality of dynamo-electric machines and a line switch, of means comprising a plurality of contactors having actuating coils for connecting said machines in different relations and for varying the voltage of said machines, a source of electrical energy for said machines, a main controller for governing the energization of the actuating coils of said contactors, means comprising an electrical device having a plurality of actuating coils for operating said main controller, a master controller for governing the energization of said device and the closure of said line switch, and means comprising a plurality of resistors, two of which are alternately employed for changing the voltage of the electrical energy supplied from said source to one coil of said device.

10. In a control system, the combination with a plurality of motors and a source of electrical energy for said motors, of a plurality of contactors having actuating coils for connecting said motors in series, in transitional and in parallel relation, a main controller for governing the energization of said actuating coils, an electrical device having a plurality of actuating coils for effecting the actuation of said main controller, means comprising a master controller for governing the energization of said device, and means comprising a plurality of resistors for respectively reducing the voltage of the energy supplied to one of the actuating coils of said device during the transitional and the other relations of said motors.

In testimony whereof, I have hereunto subscribed my name this 18th day of May, 1921.

SAMUEL B. SCHENCK.